Patented Apr. 8, 1947

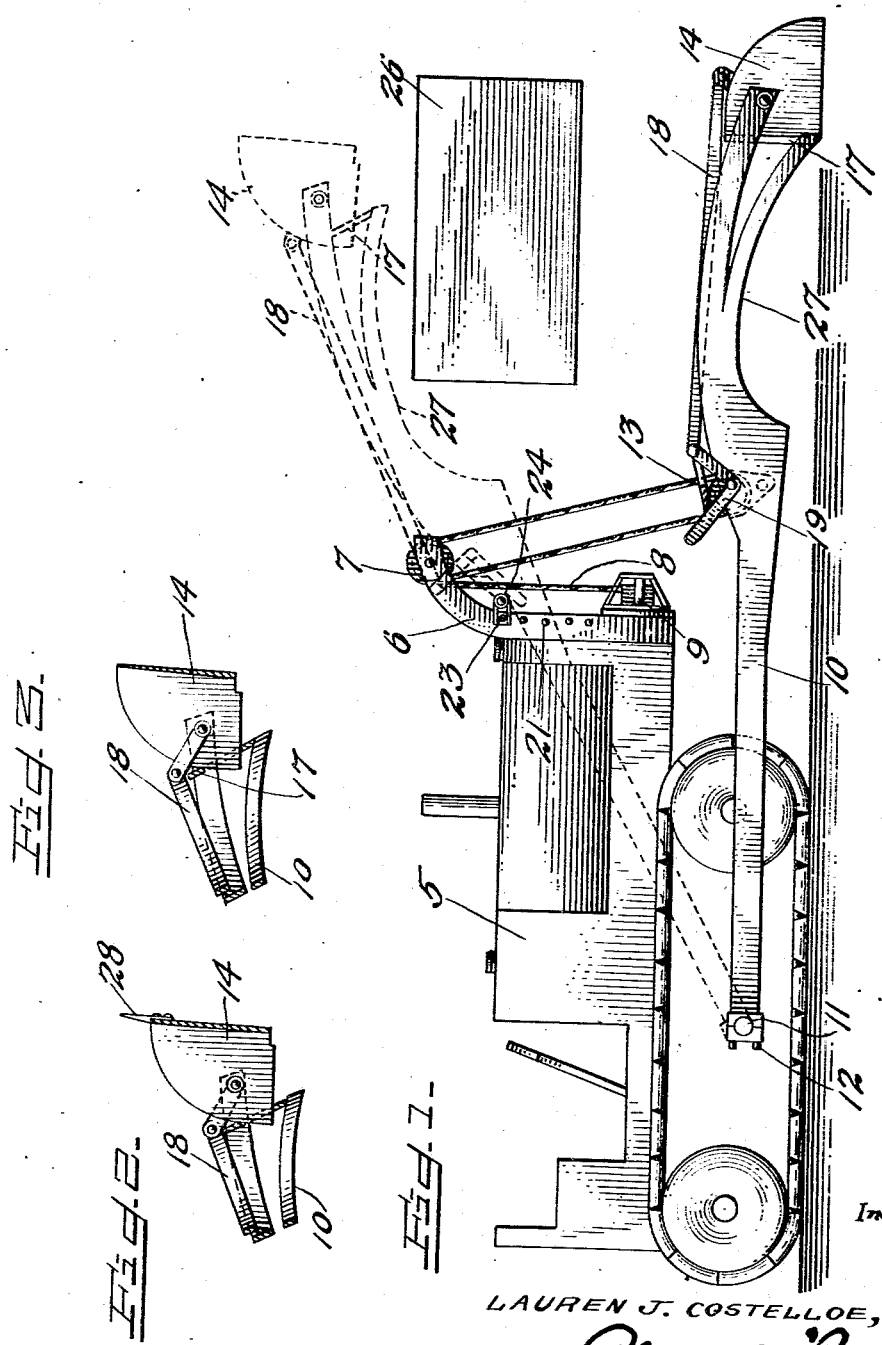

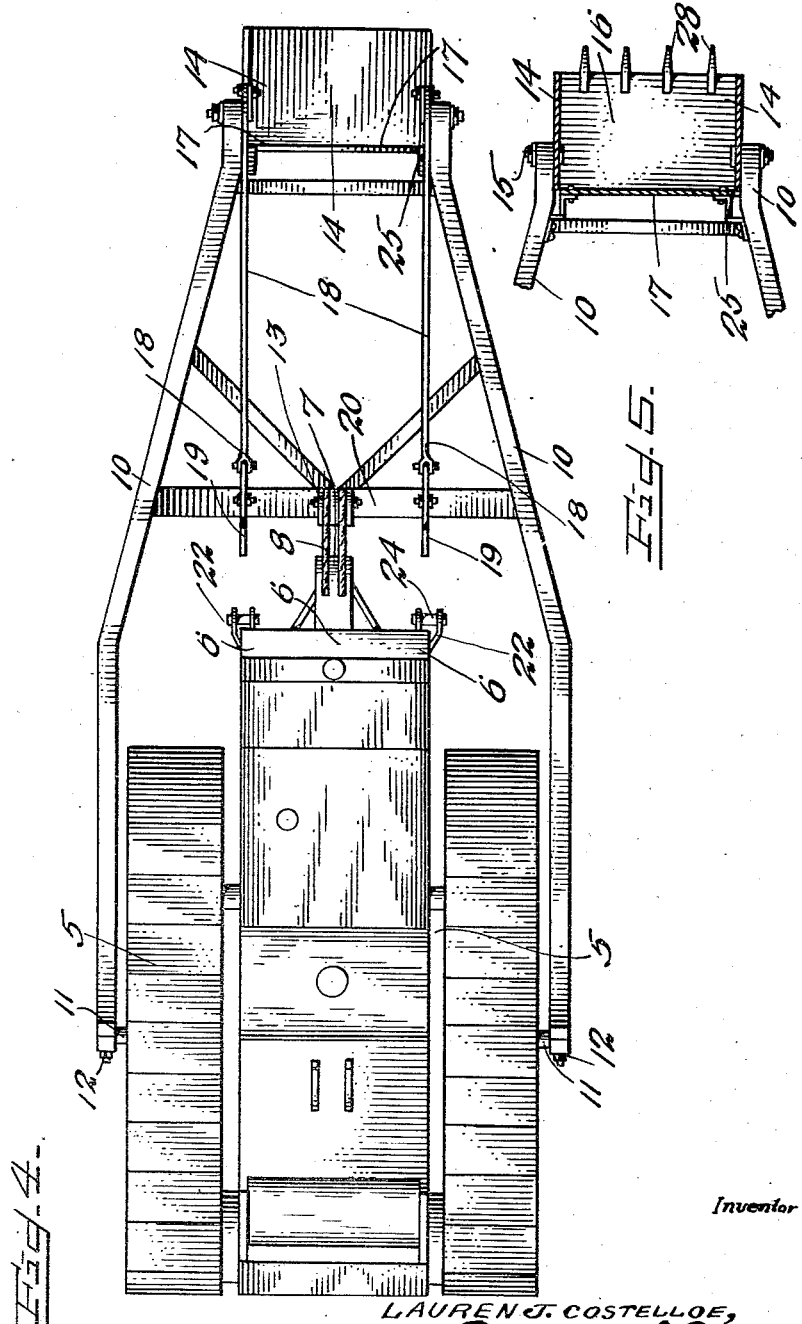

2,418,577

UNITED STATES PATENT OFFICE 2,418,577

TRACTOR MOUNTED SHOVEL LOADER ATTACHMENT

Lauren J. Costelloe, Forest Grove, Oreg.

Application July 19, 1945, Serial No. 606,012

1 Claim. (Cl. 214—140)

The present invention relates to new and useful improvements in shovel loader attachment and more particularly to an apparatus of this character commonly referred to as bulldozers and the invention has for its primary object to provide means for interchangeably attaching a loading and elevating scoop or shovel in place of the bulldozer blade.

An important object of the present invention is to provide a loading and elevating scoop of this character adapted to be fastened in front of the bulldozer in place of the bulldozer blade without necessitating any changes or alterations in the construction thereof and also embodying means for utilizing the adjusting mechanism for the bulldozer blade to raise and lower the loading scoop.

A further object of the invention is to provide a device of this character in which the scoop is filled when in its lowered position and by a forward movement of the tractor and in which the scoop is automatically emptied when raised in an elevated position.

A further object of the invention to provide an apparatus of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a fragmentary sectional view of one form of scoop in its dumping position.

Figure 3 is a similar view of a modified scoop construction.

Figure 4 is a top plan view.

Figure 5 is a fragmentary plan view of the front end of the arms for the scoop and with the scoop shown in section.

Referring now to the drawings in detail wherein for the purpose of illustration I have disclosed a preferred embodiment of the invention, the numeral 5 designates a tractor of conventional construction and of a type generally used as a bulldozer and including a pair of vertical supports 6 at the front end of the tractor curved forwardly at their upper ends and having a pulley 7 journaled therein over which a cable 8 is trained leading to a drum 9 at the lower front end of the tractor for operation by the tractor engine in the usual manner.

A pair of arms 10 are positioned at opposite sides of the tractor and project forwardly thereof, the rear ends of the arms being pivoted on a transversely extending shaft 11 by means of a sectional clamping block 12 of conventional construction.

A pulley 13 is journaled between the arms 10 intermediate the front and rear ends thereof and about which the cable 8 is trained for raising the arms 10 by winding the cable on the drum 9, the arms being lowered by gravity.

A bucket or scoop 14 is positioned between the front ends of the arms 10, the scoop being pivoted at its opposite sides to the respective arms by means of pins 15.

The scoop is provided with a bottom 16 and is open at its rear as well as at its front and when the scoop is in its lowered position the rear of the scoop is closed by a transversely extending plate 17 connected at its side edges to the respective arms 10 and extending transversely therebetween.

A pair of links 18 are pivoted at their front ends to the upper side edges of the scoop 14, the links having their rear ends pivotally attached to one end of bell crank levers 19 pivotally supported on a transversely extending brace member 20 between the arms 10.

The scoop 14 is pivoted above its center so that the bottom 16 thereof will normally gravitate into a horizontal position as shown by the full line in Figure 1 of the drawings.

The uprights 6 are provided with vertically spaced openings 21 adapted for adjustably receiving brackets 22 thereto by means of pins 23, the brackets rotatably supporting rollers 24 at their front edges and in the path of the upward movement of the rear end of the bell crank levers 19.

Accordingly in the operation of the device with the arms 10 and scoop 14 in their lower positions, as shown by the full line in Figure 1 of the drawing, the scoop may be loaded by a forward movement of the tractor 5 and the arms 10 and scoop 14 may then be raised by winding the cable 8 on the drum 9.

As the arms 10 reach the position as shown by the dotted line in Figure 1 of the drawings, the rear end of the bell crank levers 19 will engage the rollers 24 whereby to swing the bell crank levers downwardly and pull the links 18 rearwardly whereby to tilt the front end of the scoop 14 upwardly and discharge the contents thereof from the back of the scoop.

The upper side edges of the plate 17 are cut away to provide a space between the plate and the arms 10 to accommodate the sides of the scoop 14 during the upward swinging movement of the front edge thereof.

The contents of the scoop 14 may then be discharged into a truck or the like 26 and the lower edge of the arms 10 are curved upwardly adjacent their front ends as indicated at 27 to avoid interference with the truck body 26 when the scoop is moved into a position above the latter.

If desired the front edge of the scoop 14 may be provided with teeth 28 to facilitate loading thereof.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A loading attachment for tractors comprising a pair of arms pivoted at one end to the tractor and projecting forwardly therefrom, a scoop pivoted between the front ends of the arms, means carried by the tractor for raising the arms, a bell crank lever pivoted to the arms, a link connecting one end of the lever to an upper portion of the scoop, said scoop having open front and rear ends, a plate carried transversely of the arms behind the scoop to close the rear end thereof, and a stop carried by the tractor in the path of raising movement of the other end of said lever to actuate the lever in a manner to swing the front end of the scoop upwardly away from said plate to discharge the contents of the scoop from the rear end thereof.

LAUREN J. COSTELLOE.

REFERENCES CITED

The following references are of record in the file of this patent:

UNITED STATES PATENTS

| Number | Name | Date |
| --- | --- | --- |
| 2,287,152 | Waldecker | June 23, 1942 |
| 1,628,725 | Johnson | May 17, 1927 |
| 2,109,440 | Villerup | Feb. 22, 1938 |
| 2,375,801 | Le Tourneau | May 15, 1945 |
| 1,723,506 | Goodlin | Aug. 6, 1929 |
| 2,349,335 | Baldwin | May 23, 1944 |
| 1,064,456 | Dolan | June 10, 1913 |

FOREIGN PATENTS

| Number | Country | Date |
| --- | --- | --- |
| 403,917 | German | Oct 9, 1924 |